United States Patent [19]
Ohta et al.

[11] 3,928,635
[45] Dec. 23, 1975

[54] METHOD FOR PREPARATION OF PEANUT FLAKES FROM PEANUT KERNELS

[75] Inventors: Ioe Ohta, Tokyo; Akira Matsunobu; Masafumi Nishizawa, both of Kobe; Hayato Kubota, Izumiohtsu; Kenshi Sakamoto, Osaka, all of Japan

[73] Assignees: Ton Co., Ltd.; Fuji Oil Company, Ltd., both of Japan

[22] Filed: July 15, 1974

[21] Appl. No.: 488,847

[30] Foreign Application Priority Data
July 19, 1973   Japan.............................. 48-82265

[52] U.S. Cl. ............... 426/312; 426/430; 426/457; 426/461; 426/464; 426/481; 426/507; 426/511; 426/518; 426/632
[51] Int. Cl.²............................................ A23L 1/36
[58] Field of Search .......... 426/312, 481, 518, 464, 426/377, 209, 217, 352, 372, 373, 430, 457, 461, 507, 511

[56] References Cited
UNITED STATES PATENTS

| | | | |
|---|---|---|---|
| 3,645,752 | 2/1972 | Baxley ................................ | 426/352 |
| 3,689,287 | 9/1972 | Mitchell.............................. | 426/457 |

FOREIGN PATENTS OR APPLICATIONS

| | | | |
|---|---|---|---|
| 720,184 | 11/1951 | United Kingdom................ | 426/430 |

OTHER PUBLICATIONS

Morris et al.; "Abstract Bibliography of the Chemistry & Technology of Peanuts (1830–1939);" Southern Regional Research Lab.; New Orleans, La.; 1949; pp. 37, 42, 46.

Jones et al.; "Peanut Research" (1942–1961); Southern Utilization Research & Development Div.; New Orleans, La., pp. 13, 14, 1962.

*Primary Examiner*—S. Leon Bashore
*Assistant Examiner*—Kenneth M. Schor
*Attorney, Agent, or Firm*—Wenderoth, Lind & Ponack

[57] ABSTRACT

A method for preparation of peanut slices from peanut kernels, which comprises steps of dividing each of the raw peanuts into a pair of fractions, slicing each fraction of the peanuts in a direction parallel to the confronting surface between the fractions, steaming the sliced peanuts to eliminate a peculiar offensive taste the peanut has and finally drying the steamed, sliced peanuts. Ethanol treatment may be effected to improve the taste and flavor of the finished peanut slices.

8 Claims, No Drawings

METHOD FOR PREPARATION OF PEANUT FLAKES FROM PEANUT KERNELS

The present invention relates to a method for preparation of peanut slices from peanut kernels.

There is increased demand for sliced almond which has been cut into slices to be used for decorating some bakery and confectionary products, including cakes, and ice creams. The almond flakes can be obtained by slicing almond kernels with a slicing machine in a direction parallel to its major axis and no marked difficulty can be found in this process per se. However, cultivation of the almond is largely limited to the southwestern part of North America. Therefore, the price of the almond markedly fluctuates depending on the weather and the export and agricultural policy of the United States of America, and further, it is relatively high. Contrary thereto, since the peanut is cultivated in most tropical and mild temperature regions, there is small possibility of fluctuation of the price of the peanut and the peanut is available at a lower price than that of the almond because of the high absolute yield. Furthermore, because the peanut is an annual plant, different from the almond, planted acreage thereof can be easily changed according to the variation of the demand. Thus peanuts are superior from the standpoint of a stable supply. Accordingly, utilizing the peanut, cheap and stable in supply, instead of the almond, expensive and unstable in supply, becomes beneficial for both manufacturers of bakery and confectionary products and consumers.

However, considering the peanut's utility as a substitute for the sliced almond, we may find two difficulties to be solved. Namely, one of the difficulties involves the fact that the peanut has an approximately circular section to its major axis passing through the embryo and this is quite different from the almond. The other difficulty involves the fact that it has a peculiar grassy taste and flavor. Due to the former fact, a peanut kernel tends to rotate about the major axis passing through the embryo when it is to be sliced at an angle transverse of the plane of the confronting surface of both fractions of the peanut kernel. Therefore, slices of the peanut kernels can hardly be obtained in uniform and relatively large size unless the peanut kernel supplied to a slicing machine happens to be positioned in such a manner that the confronting surface thereof becomes parallel to the cutting blade. Consequently, the yield of the peanut slices having a commercially acceptable value will be relatively small. A problem of how to slice peanut kernels in a direction parallel to the confronting surface should, by all means, be solved to enable peanut flakes to be manufactured on an industrial scale, or otherwise development of the peanut slices will not be achieved. Irrespective of this, to the knowledge of the inventors, development of the peanut slices has not heretofore been accomplished, nor have publications thereon been available.

However, when the inventors imagined the best way to develop a method for producing peanut slices, the inventors had an idea to separate a pair of fractions of a peanut kernel from each other and then to slice each peanut fraction. Although, conclusively speaking, this seems to be very simple idea, it is an important clue to the present invention. That is to say, combination between the fractions of one peanut kernel is so comparatively loose that they can be easily separated from each other by simple mechanical means and each of the peanut fractions thus separated has an approximately semi-circular section to its major axis. Therefore, the inventors at first assumed that each peanut fraction obtained will assume an optimum position for slicing since said peanut fraction will be obviated from free rotation during slicing operation and then the slicing will, in most cases, be done parallel to the confronting surface of the fractions of each peanut kernel. As a matter of fact, our experimental results obtained by the use of a commercially available rotary slicer manufactured by Bauermeister, a German firm, supported the above assumption. However, in the course of the experiment, it has been found that the moisture content in each peanut fraction prior to being sliced is an important factor to be considered to obtain a good result, and that if the moisture content is below 6 or over 14 percent, the yield of peanut flakes of relatively large size having a minimum diameter of 7.5mm. will be small and that the best result will be obtained when the moisture content is within the range of 9 to 11 percent. Change in the yield from different moisture contents is supposed to be due to (1) change in the texture of the peanut and (2) physical correlation between the cutting blade and the texture of the peanut. However, the change in the peanut texture will be most responsible. The following table I illustrates correlations between the moisture content and the yield obtained when peanut fractions of relatively large size having the minimum diameter over 7mm. were sliced with the aforementioned Bauermeister's Model MH022 machine. At this time, the clearance between the tip of the cutting blade and the slot through which slices cutted are discharged was set to be 8mm. and the blade was rotated at 135 rpm. Each experiment was carried out with 4 Kg. of raw material.

From the Table I, the following facts have become clarified.

a. The yield of the large-sized slices having a minimum diameter over 7.5mm. from the fractioned peanuts is 15 to 25 percent higher than that from non-fractioned peanuts.

b. The yield of the medium-sized slices having a minimum diameter in the range of 6.0 to 7.5mm. from the non-fractioned peanuts is about twice that from the fractioned peanuts.

c. The yield of the small-sized slices having a minimum diameter in the range of 3.5 to 6.0mm. from the non-fractioned peanuts is higher than that from fractioned peanuts in a similar manner as in the item (b). However, the shape of the former product is commercially inferior to that of the latter in view of few elliptical product present.

Table I

| Class (mm.) | Fractioned Peanut Kernels | | | | | Non-fractioned Peanut Kernels | | | | |
|---|---|---|---|---|---|---|---|---|---|---|
| | <1.0 | 1.0–3.5 | 3.5–6.0 | 6.0–7.5 | 7.5< | <1.0 | 1.0–3.5 | 3.5–6.0 | 6.0–7.5 | 7.5< |
| 6.5 | 7.8 | 12.5 | 14.2 | 17.3 | 48.4 | | | | | |
| 7.0 | | | | | | 5.6 | 13.0 | 28.1 | 19.9 | 33.4 |
| 7.5 | 6.0 | 10.3 | 12.7 | 16.8 | 54.2 | | | | | |
| 8.0 | | | | | | 4.3 | 11.6 | 21.1 | 21.6 | 41.4 |

Table I-continued

| | | Types of Raw Material | | | | | | | | |
|---|---|---|---|---|---|---|---|---|---|---|
| | | Fractioned Peanut Kernels | | | | | Non-fractioned Peanut Kernels | | | |
| | Class (mm.) | <1.0 | 1.0-3.5 | 3.5-6.0 | 6.0-7.5 | 7.5< | <1.0 | 1.0-3.5 | 3.5-6.0 | 6.0-7.5 | 7.5< |
| Moisture | 8.5 | 4.1 | 9.1 | 11.8 | 15.1 | 60.0 | | | | | |
| | 9.0 | | | | | | 4.3 | 11.8 | 20.7 | 31.2 | 32.0 |
| Content | 10.0 | 2.8 | 7.5 | 10.6 | 13.8 | 63.3 | 2.9 | 9.3 | 19.5 | 29.3 | 39.0 |
| | 10.5 | 2.8 | 8.5 | 10.8 | 13.6 | 64.8 | 2.7 | 10.0 | 22.4 | 27.4 | 37.5 |
| (%) | 10.75 | 2.8 | 7.7 | 11.3 | 12.1 | 66.1 | | | | | |
| | 11.0 | 2.4 | 7.5 | 10.9 | 14.0 | 65.2 | 2.5 | 10.0 | 17.9 | 28.6 | 41.0 |
| | 12.5 | 2.7 | 9.2 | 13.4 | 13.3 | 61.4 | | | | | |
| | 14.0 | 3.1 | 14.8 | 19.5 | 16.9 | 45.7 | | | | | |
| | 17.3* | 6.4 | 24.6 | 25.3 | 15.2 | 28.5 | | | | | |

*: becomes impossible to slice during the slicing operation (Amount of the raw material left unsliced was 1.0Kg., i.e., about 25%.

d. In respect of the powdery and fine slices having a minimum diameter of 1.0mm. or less and 1.0 and 3.5mm., respectively, no significance can be seen between both of the starting materials. However, in any respect, it is true that the weight percentages of these waste product from the non-fractioned peanuts is higher than that from the fractioned peanuts.

e. The yield of the large-sized slices having a minimum diameter over 7.5mm. is increased as the moisture content in the fractioned peanuts increases and reaches the maximum value at the moisture content of 10.5 to 11.0 percent. The rate of the increase is comparatively low, but it rapidly decreases once said maximum value has been attained. On the other hand, in the non-fractioned peanuts, such a clear correlation between the moisture content and the yield is hardly seen.

f. The yield of the medium-sized slices having a minimum diameter of 6.0 to 7.5mm. tends to increase as the moisture content attains a value of 10.75 percent as the critical point (the lowermost limit of the yield), but the difference between the maximum and minimum values is not so much.

g. The yield of ones having the minimum diameters of 3.5 to 6.0mm, 1.0 to 3.5mm. and below 1.0mm., respectively, tends to increase as the moisture content of fractioned peanuts departs from the range of 10.5 to 10.75 percent as described in the item (f). But, the rate of the increase in the yield is faster than that of the decrease.

From the above experimental results, it is clear that the use of the fractioned peanuts as the raw material and the control of the moisture content within a specific range in each fraction of the peanuts are effective.

Now that the problem of how to slice peanuts effectively has been solved by the use of the fractioned peanuts with the controlled moisture content within the specific range, there remains an important problem as to how to improve the taste.

The raw peanuts posses a grassy taste which seems to be caused by lower to higher saturated or unsaturated aldehydes or ketones. Therefore, in order to market it, this undesirable taste should be removed. It has been well-known that peanuts generate specific fragrance when roasted, but this fragrance does not last long and it will rather hinder the use of the sliced peanuts as a substitute for the sliced almonds. In this connection, the inventors have studied various deodorizing methods instead of roasting and have at last found that steaming is most effective. In case where suitable steaming was done, not only peculiar taste and odor of the peanuts almost vanished, but also the product becomes one with an almond-like texture in the mouth. The following tables II, III and IV illustrate changes in the taste, texture and color of the product under several steaming conditions. In these experiments, the slices steamed were subjected to two step drying; one with hot air to dry each peanut fraction until the moisture content thereof attains 6 percent and the other with application of microwave radiation to dry the peanut fraction until the moisture content thereof attains about 3 percent.

Table II

Result of Steaming at 105°C. in Autoclave

| Steaming Period | Grassiness | Bitterness | Texture | Color |
|---|---|---|---|---|
| 2 minutes | + | − | good | good |
| 4 minutes | ± | − | good | good |
| 8 minutes | − | ± | bad | slightly bad |
| 10 minutes | − | + | bad | bad |
| 15 minutes | − | + | bad | bad |

Table III

Result of Steaming at 120°C. in Autoclave

| Steaming Period | Grassiness | Bitterness | Texture | Color |
|---|---|---|---|---|
| 2 minutes | − | − | slightly bad | good |
| 4 minutes | ± | ± | bad | slightly bad |
| 8 minutes | − | + | bad | bad |
| 10 minutes | − | + | bad | bad |
| 15 minutes | − | + | bad | bad |

Table IV

Result of Steaming at 90°C. in a Steaming Vessel

| Steaming Period | Grassiness | Bitterness | Texture | Color |
|---|---|---|---|---|
| 2 minutes | + | − | good | good |
| 4 minutes | + | − | good | good |
| 8 minutes | + | − | good | good |
| 15 minutes | + | ± | good | good |
| 30 minutes | ± | + | bad | slightly bad |
| 40 minutes | − | + | bad | bad |

As seen from the above tables, the grassy taste decreases as the steaming temperature is raised, but two higher temperatures or too longer steaming cause bitterness and further the texture and color to change worse. Although there can be seen little bad influence on the texture and color at the steaming temperature of 90°C. it seems to be uneconomical since it takes a long time for the removal of the grassy taste. On the other hand, a higher temperature such as of 120°C. will effect rapid removal of the grassy taste, but it readily causes generation of the bitterness and also stimulates the deterioration in the texture and color. In consideration of the antagonistic conditions hereinabove, it may be said that heating at 100° to 110°C. for 1 to 5 minutes is optimum. However, in practice, it should empirically be determined in consideration of various working conditions such as size, thickness, amount, etc. of the slices to be deodorized.

As the result of further study, the inventors have further found that an ethanol treatment to the raw material, either raw peanuts, separated fractions thereof or slices of the latter, not only accelerates the removal of the grassy taste by the steaming, but also, unexpectedly, gives sweetness for the product.

The following table V shows the result of an organoleptic test wherein large-sized peanuts having the minimum diameter of 7mm or more were divided into fractions, moistened to the moisture content of 9 percent, sliced with the above slicing machine to provide slices of 8mm. in thickness. These slices are tightly closed for 5 hours in a vessel with ethanol added in an amount of 0 to 5 percent relative to the weight of the slices, then steamed for 2 minutes in an autoclave under a pressure of 1.4Kg/cm² and at about 109°C. and finally dried with hot air and microwave radiation.

Table V

| Ethanol Concentration | Grassiness | Roughness | Bitterness | Sweetness |
|---|---|---|---|---|
| 0% | + | + | − | − |
| 0.5% | − | ± | − | ± |
| 1.0% | − | − | − | ++ |
| 2.0% | − | − | − | ++ |
| 5.0 | − | − | − | −+ |

It has been found that the effect of the above ethanol treatment was similar to the non-fractioned peanuts or fractioned peanuts not sliced or to the slices being steamed. But, it seems that it gives somewhat less effect than the ethanol treatment of the slices before the steaming mentioned above. According to some literature, 21 kinds of volatile off-flavor ingredients were detected by gas chromatography and among the compounds identified were comparatively low aliphtic alcohols, aldehydes and ketones which are not reactive by only contacting with ethanol at a room temperature. Therefore, it has not been clear why the grassy taste vanishes with ethanol treatment.

To practice the present invention, each of large-sized peanuts (as large as possible) are skinned off, dried, divided into two fractions, moistened with addition of a predetermined amount of water, allowed to stand in a closed atmosphere, and are sliced with a slicing machine, when the moisture content attains a constant value, to provide slices of a predetermined thickness. The slices are then classified and the classified slices are put in an autoclave, steamed at a predetermined temperature for a predetermined period of time, and dried with hot air and, further, preferrably, with microwave radiation until the moisture content thereof attains 3 percent. The classification with a sieve may be carried out after the drying has been finished.

The ethanol treatment may be applied during any of the steps mentioned above and listed below. Practically, this treatment may voluntarily be carried out during the steps once or more as in the list below.

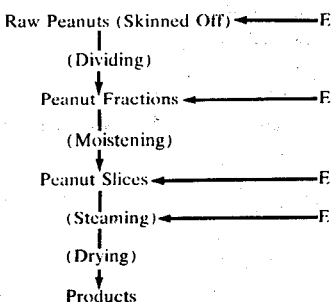

wherein E represents addition of ethanol.

However, to fully exploit the removal of the grassy taste with ethanol, it has been empirically found that it would be better that the slices are as thin as possible and the treatment period is as long as possible so as to allow perfect penetration of ethanol solution or vapor into the material to be treated. The amount of ethanol to be added is sufficient if it is over 0.5 percent, preferably, over 1.0 percent relative to the weight of the material to be treated. However, in the case where the ethanol is added at the time of the steaming, an amount over 5 percent is preferable, because the lower concentration will not cause sufficient permeation of the ethanolic vapor even though a higher temperature is used, since the steaming time is short. Similarly, somewhat higher concentration of ethanol to be added is desirable in the case where the ethanol treatment is carried out subject to the non-fractioned peanuts or fractioned peanuts compared with one to the slices. The addition of ethanol to the peanut fractions may be done simultaneously or separately with the moistening.

The generation of sweetness by the ethanol treatment appears to be an enormous effect. It is impossible to suppose that origosaccharides in peanuts will change to mono- or di-saccharides. Thus, we can only imagine a different cause of such effect at present.

The sliced peanuts, thus obtained have a mild texture in the mouth and a pleasant chewiness and can broadly be applied in confectionary products. The thickness of each peanut slices may be changed as desired according to its purpose by adjusting the distance between the slot and the tip of the blade of the machine. However, in general, 0.8±0.1 mm. in thickness is preferable.

According to the present invention, the inventors can economically and inexpensively supply novel peanut slices not heretofore available, and with a special taste different from known almond flakes. Thus it is advantageous in originating a novel confectionary material on the market.

The present invention is more fully explained by the following examples. However, it should be understood that they are only for illustrative purposes and, therefore, the invention should not be limited thereto.

EXAMPLE I

100Kg. of large-sized peanuts was skinned off by a wet process and dried by hot air of 70°C. until the moisture content thereof attained 6 percent and each divided into fractions with a dividing machine (manufactured by Tani & Co.). 4.2Kg. of water was sprayed to the fractioned peanuts which were then allowed to stand for an overnight in an air-tight vessel. Next morning, the moistened peanut fractions were taken out of the vessel and allowed to stand on a shelf to evaporate the water attached to the surface of each of the peanut fractions (moisture content: about 10 percent)

Thereafter, the moistened peanuts were sliced with a slicing machine (Bauermeister's Model MH022) wherein the distance between the cutting blade and the slot was adjusted to 0.8mm. The slices thus obtained were put into an autoclave and steamed for 5 minutes at 105°C. by injecting super-heated steam thereinto. The steamed slices (moisture content: about 12 percent) were taken out of the autoclave, dried for 10 minutes with hot air heated to 70°C. until the moisture content attained 6 percent, and then dried for 8 minutes in a continuous high-frequency drier (Output; 4.5 KW., Frequency; 2450 ± 5 MHz) to obtain peanut slices having a moisture content of about 3 percent. The product was then classified with a 7.5mm. rotary shifter. 62Kg. of finished peanut slices having the minimum diameter over 7.5mm. could be obtained.

EXAMPLE II

100Kg. of large-sized peanuts having a moisture content of 4 percent was skinned off with a dry process and then divided in the manner as in Example I. To the peanut fractions, 7.2Kg. of water was sprayed and they were allowed to stand in a closed vessel at below 10°C. for an overnight and processed in the manner as in Example I to give 62Kg. of finished peanut flakes having the minimum diameter over 7.5mm.

EXAMPLE III

10Kg. of large-sized peanuts having the minimum diameter over 7mm. were skinned off with a wet process and divided in the manner as in Example I. 0.22Kg. of water was sprayed to the peanut fractions which were then subjected to entrap in a closed vessel and to drying.

The peanut fractions containing water in an amount of about 9 percent were then divided equally into five samples to which solutions containing water in an amount of 90cc and ethanol in an amount of 0, 10, 20, 40 and 100cc, were respectively added. The samples were put into a closed vessel, allowed to stand for 18 hours and then sliced in the manner as in Example I. The ethanol treated peanut samples were then autoclaved for 2 minuted under 1.4Kg/cm², dried with hot air of 60°C. until the moisture content of the peanut fractions of each sample attained 5 to 6 percent and further dried with a microwave drier until the same moisture content attained 3 to 4 percent.

The individual samples thus obtained were then organoleptically tested with competent panels in connection with the grassy taste, roughness, bitterness and sweetness, and the result of the test is illustrated in the following table VI.

Table VI

| Ethanol Added (ml) | Grassiness | Roughness | Bitterness | Sweetness |
| --- | --- | --- | --- | --- |
| 0 | + | + | − | − |
| 10 | − | − | − | ± |
| 20 | − | − | − | − |

Table VI-continued

| Ethanol Added (ml) | Grassiness | Roughness | Bitterness | Sweetness |
| --- | --- | --- | --- | --- |
| 40 | − | − | − | + + |
| 100 | − | − | − | + + |

EXAMPLE IV

12Kg. of the peanut fractions obtained in the manner as in Example I were divided equally into six samples which were then autoclaved for 2 minutes under 1.4Kg/cm². At the autoclaving, these samples were added with 0, 10, 20, 40, 100 and 200ml. of ethanol, respectively. After steaming, the individual samples were dried in the manner as in Example I to obtain peanut slices each having the moisture content of 3 to 4 percent. The organoleptic test showed the following results.

Table VII

| Ethanol Added (ml) | Grassiness | Roughness | Bitterness | Sweetness |
| --- | --- | --- | --- | --- |
| 0 | + | + | − | − |
| 10 | + | + | − | − |
| 20 | + | + | − | − |
| 40 | ± | + | − | ± |
| 100 | − | − | − | + |
| 200 | − | − | − | + |

Although the present invention has been fully described by way of example, it should be noted that various changes and modifications are apparent to those skilled in the art and, therefore, such changes and modifications are, unless otherwise departing from the true scope of the present invention, to be understood as included therein.

What we claim is:

1. A method for preparation of peanut slices from peanut kernels, which comprises steps of dividing each of skinned raw peanuts into a pair of peanut fractions each having a moisture content of 6 to 14 percent, slicing said peanut fractions in a direction substantially parallel to the confronting surface between said peanut fractions of each pair thereby providing sliced peanuts, steaming the sliced peanuts and drying the same.

2. A method as claimed in claim 1, wherein the peanut fractions are contacted with ethanol.

3. A method as claimed in claim 2, wherein said ethanol is in a liquid state.

4. A method as claimed in claim 2, wherein said ethanol is a gaseous state.

5. A method as claimed in claim 2, wherein the amount of ethanol is at least 0.5 percent by weight relative to the total weight of the raw peanuts to be treated.

6. A method as claimed in claim 2 wherein the steaming is performed at 90° to 120°C for 2 to 15 minutes.

7. A method as claimed in claim 1 wherein the slicing is performed so as to obtain a maximum yield of slices having a minimum diameter of 6.0 mm.

8. A method according to claim 1 wherein said moisture content is 9 to 11 percent.

* * * * *